No. 629,651. Patented July 25, 1899.
J. BRENZINGER.
CLUTCH.
(Application filed Mar. 29, 1899.)
(No Model.)
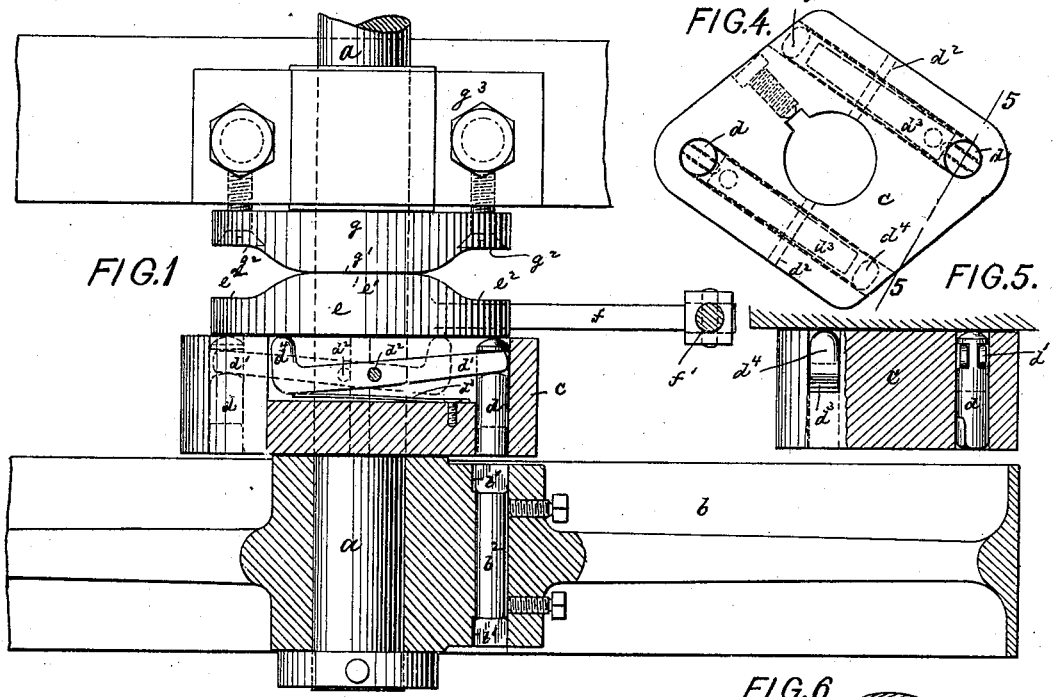
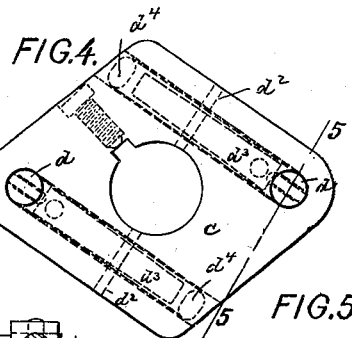
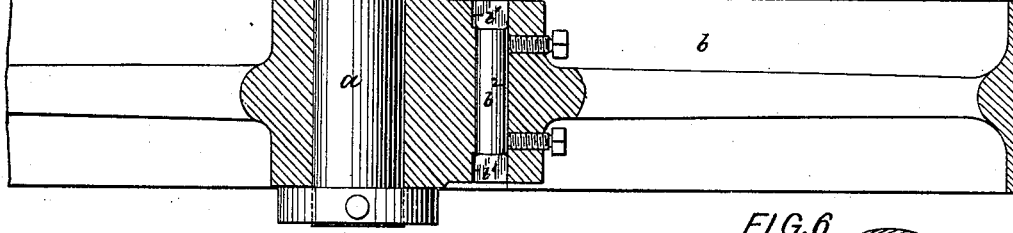
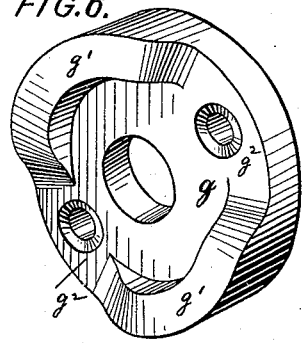
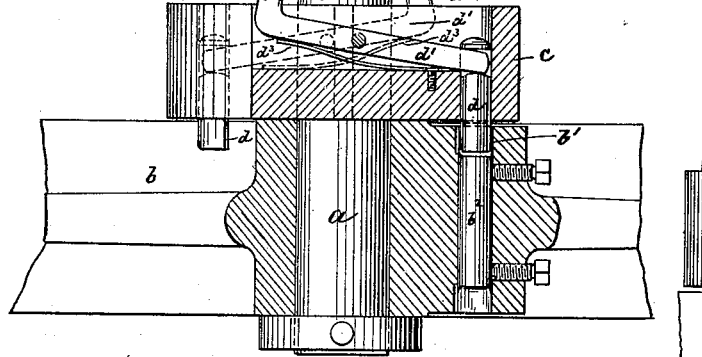
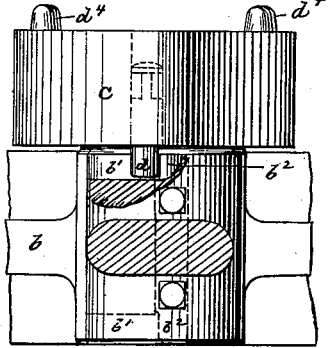
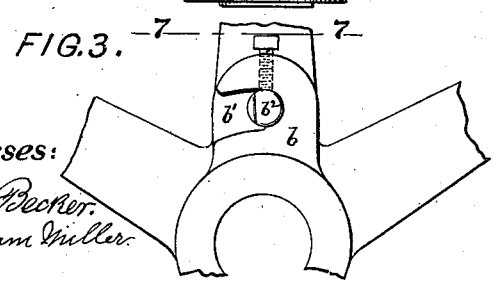
Witnesses:
John Becker.
William Miller.
Inventor:
Julius Brenzinger
by his attorneys
Roeder & Briesen
THE NORRIS PETERS CO., PHOTO-LITHO., WASHINGTON, D. C.

UNITED STATES PATENT OFFICE.

JULIUS BRENZINGER, OF NEW YORK, N. Y., ASSIGNOR TO MAX AMS, OF SAME PLACE.

CLUTCH.

SPECIFICATION forming part of Letters Patent No. 629,651, dated July 25, 1899.

Application filed March 29, 1899. Serial No. 710,863. (No model.)

*To all whom it may concern:*

Be it known that I, JULIUS BRENZINGER, a citizen of Germany, and a resident of New York city, county and State of New York, have invented new and useful Improvements in Clutches, of which the following is a specification.

This invention relates to a clutch which is adapted for coupling and uncoupling driving-pulleys and for other purposes and which is positive and reliable in its operation.

In the accompanying drawings, Figure 1 is a plan, partly in section, of my improved clutch, showing the pulley uncoupled; Fig. 2, a similar view showing the pulley coupled; Fig. 3, a detail of part of the hub of the pulley; Fig. 4, a face view of the collar $c$; Fig. 5, a section on line 5 5, Fig. 4; Fig. 6, a perspective view of fixed cam $g$; and Fig. 7, a section on line 7 7, Fig. 3.

The letter $a$ represents the shaft to be driven by a pulley $b$, which is adapted to be coupled to and uncoupled from the shaft by means of my improved clutch. At the side of pulley $b$ there is keyed to shaft $a$ a collar $c$, shown to be provided with two transverse perforations that receive the sliding bolts $d$, though in some cases a single bolt may be sufficient. The heads of the bolts $d$ are engaged by the forked ends of levers $d'$, having outwardly-extending projections $d^4$ and pivoted at $d^2$ within recesses of collar $c$. Springs $d^3$, bearing against the levers $d'$, tend to throw the projecting ends $d^4$ outwardly.

Close against the side of collar $c$ there is rotatably mounted upon shaft $a$ a sliding cam $e$, adapted to be turned by means of a lever $f$, which may connect to a shifting-lever $f'$. The cam $e$ is provided with two or more projections $e'$ and intervening recesses $e^2$ and coacts with a fixed cam $g$, having correspondingly-arranged projections $g'$ and recesses $g^2$ and fitted to a part $g^3$ of the machine-frame.

The pulley $b$ is provided with a slot or opening $b'$, which may be reinforced by an abutment $b^2$, Fig. 3, and which is adapted to be engaged by one of the bolts $d$ when brought into alinement therewith. I prefer to form oppositely-opening slots $b'$ on the opposite faces of the pulley, Fig. 7, so that by reversing the position of the pulley the machine may be driven in either direction.

The operation is as follows: To couple the pulley to the shaft, the cam $e$ is so turned that its depressions are brought opposite the projections of cam $g$, Fig. 2. The springs $d^3$ will now be at liberty to force the free ends $d^4$ of the levers $d'$ outward by sliding the cam $e$ away from collar $c$. The pins $d$ are in this way forced into the slots $b'$ of pulley $b$ and will couple the pulley to the collar. For uncoupling the cam $e$ is turned ninety degrees to bring its projections opposite the projections of cam $g$, Fig. 1. This will cause the cam $e$ to be shifted toward the collar $c$ and the levers $d'$ to be turned inward against action of springs $d^3$ to withdraw the pins $d$ from slots $b'$ and liberate the pulley $b$. It will be seen that when the cam $e$ is lowered upon the collar the levers $d$ will instantaneously impinge against the lower face of the cam to instantly uncouple the clutch, as every point on the cam's surface is equally effective for vibrating the lever. Thus the moment the shifting-lever has been set the machine will be stopped and dead-motion will not ensue.

What I claim is—

A clutch composed of a perforated collar, a spring-actuated lever having an outwardly-extending projection and pivoted to the collar, a coupling-pin operated thereby, a sliding cam having a face which is adapted to engage the projection of the lever when lowered upon the collar, and means for moving said cam toward and away from the collar, substantially as specified.

JULIUS BRENZINGER.

Witnesses:
F. V. BRIESEN,
WILLIAM MILLER.